United States Patent [19]

Batley, Jr. et al.

[11] 4,130,553

[45] Dec. 19, 1978

[54] PROCESS FOR IMPROVING THE NUTRITIONAL VALUE OF GREEN PLANT PROTEIN

[76] Inventors: William R. Batley, Jr., P.O. Box 216, Brawley, Calif. 92227; Walter J. Bray, 510 Pine Top Trail, Bethlehem, Pa. 18017

[21] Appl. No.: 757,011

[22] Filed: Jan. 5, 1977

[51] Int. Cl.$^2$ .............................................. A23J 1/14
[52] U.S. Cl. .............................................. 260/112 R
[58] Field of Search .................................... 260/112 R

[56] References Cited

U.S. PATENT DOCUMENTS

| | | | |
|---|---|---|---|
| 3,684,520 | 8/1972 | Bickoff et al. | 260/112 R X |
| 3,775,133 | 11/1973 | Batley | 260/112 R X |
| 3,821,080 | 6/1974 | Kalina et al. | 260/112 R X |
| 3,823,128 | 7/1974 | Bickoff et al. | 260/112 R |

OTHER PUBLICATIONS

Bray, *Chem. Engineering*, 1/22/73, pp. 76–77.

*Primary Examiner*—Walter C. Danison
*Attorney, Agent, or Firm*—Lyon & Lyon

[57] ABSTRACT

A process for improving the nutritional value of green plant protein is presented. The process comprises adjusting the pH of protein-containing juice liberated from green plants to a value greater than about 9.0 before separating the protein from the juice.

27 Claims, No Drawings

PROCESS FOR IMPROVING THE NUTRITIONAL VALUE OF GREEN PLANT PROTEIN

BACKGROUND OF THE INVENTION

This invention relates to a process by which the nutritional value of protein obtained from green plants is enhanced. More specifically, the present invention relates to a process whereby the protein recovered from leafy green plants consists of a greater percentage of the more nutritious cytoplasmic protein, as opposed to the less nutritious chloroplastic protein.

In the recovery of protein from green plants, normally a protein-containing juice is liberated from the plants by pressing, or the like. This juice contains two forms of protein, i.e., cytoplasmic protein and chloroplastic protein. The cytoplasmic protein is associated with the cytoplasm of a plant, whereas the chloroplastic protein is associated with chloroplasts of the plant. The cytoplasm is a liquid contained within the cell walls of the plant and the cytoplasmic protein is in solution in the cytoplasm. The chloroplasts are solid particles dispersed throughout a plant cell and the chloroplastic protein is physically associated with those chloroplasts. Also contained with the juice are sugars, salts, vitamins, pigments and other plant materials.

After the protein-containing juice has been liberated from the plants, the protein is separated from the juice. This may be accomplished by heating the juice to a temperature of 70° C. or more by adjusting the pH of the juice to a value below 5.0 or by a combination of these steps. In either case, most of the protein will coagulate and precipitate from the juice. Then the protein coagulum, or curd, may be isolated by conventional means such as decantation, filtration or centrifugation.

One such prior art method for recovering protein from green leafy plants is the wet fractionation process described in U.S. Pat. No. 3,775,133, to William R. Batley, Jr., one of the inventors herein. The disclosure of that patent is incorporated herein by reference.

Although the wet fractionation process of U.S. Pat. No. 3,775,133 provided a method for increasing the protein recovery from leafy green plants, it produces a product having a cytoplasmic protein content of less than about 45%. Other commercial prior art processes provide even less total protein recovery and no better cytoplasmic protein content.

In some cases it is desirable to have a protein product which is high in cytoplasmic protein. The desirability of cytoplasmic protein stems from the fact that it is more easily digested under the acid conditions of the stomach than is chloroplastic protein, and is therefore more efficient in some uses.

An indicator of the nutritional value of protein is its protein efficiency ratio, or PER, which is defined as the grams in weight gain of test animals per gram of protein eaten. Laboratory work has shown that the protein efficiency ratio of chloroplastic protein is between about 0.5 and 0.8. On the other hand, the PER of cytoplasmic protein is about 2.5. It is recommended that protein to be used as nutritional supplements have a protein efficiency ratio approaching that of casein, a phosphoprotein of milk, which has a PER of about 2.5.

Much attention has been directed toward solving the low nutritional value problem of green plant protein. Although initially such protein was not even a very suitable feed for non-ruminant animals, this attention has resulted in substantial improvements in the digestibility, protein efficiency ratio and other measures of the nutritional value of green plant protein. For instance, it is now known that the temperature at which the product is dried is of utmost importance. That is, if the product is dried at 40° C., rather than 100° C., the nutritional value thereof is approximately doubled. Also, the desirability of rapidly processing the green plants once harvested and of washing the product before drying is now known. As a result of such developments, currently produced green plant protein generally has a protein efficiency ratio of between 1.2 and 1.5.

Recently, to obtain green plant protein with an even better nutritional value, two approaches have been taken. One involves the supplementation of the green plant protein with certain amino acids, while the other involves the fractional separation of the protein into a chloroplastic portion and a cytoplasmic portion.

In the first approach, methionine, sometimes along with lysine and leucine, is added in small amounts to a green plant protein product. Since these are the limiting essential amino acids, their addition has an ameliorative effect on the nutritional value of the protein.

In the second approach, the chloroplastic protein, along with the chloroplasts with which it is associated, is separated from the protein-containing juice by either high speed centrifugation or by a process based on the fact that the chloroplasts and chloroplastic protein will coagulate and separate from the other plant components in the juice at a lower temperature than the cytoplasmic protein. Such a separation allows for the eventual protein product to be comprised of substantially all high nutritional value cytoplasmic protein.

However, it should be noted that by utilizing fractional separation in the aforementioned manner, the protein product yield is dramatically reduced. This is due to the fact that for most green plants, cytoplasmic protein accounts for only about 30–45% of the total protein recoverable from the plants by previously known commercial methods, and the cytoplasmic protein fraction is substantially the only protein being recovered.

SUMMARY OF THE INVENTION

The present invention affords an improved process for obtaining protein from leafy green plants whereby the nutritional value of such protein is enhanced. This process is based upon a new and different approach to the enhancement of the nutritional value of the protein product which results in increasing the percentage of cytoplasmic protein and lowering the percentage of chloroplastic protein in the final product by extracting protein from the plants under conditions which result in chloroplastic protein being converted to cytoplasmic protein.

The improved process of the present invention comprises adjusting the pH of the protein-containing juice liberated from green plants, such as alfalfa, to a value greater than about 9.0, preferably to within the range from about 9.5 to about 11.0, before separating the protein from the juice. A maximum pH of about 11.0 and at most 12.0 is preferable because above 11.0 saponification of juice components and protein degradation is caused by the presence of the amount of alkali needed to raise the pH of the protein-containing juice to such level.

The pH adjustment step of the invention may be made by treating the plants with an alkaline solution before the juice is liberated therefrom, such as by spraying the plants with the alkaline solution; by treating the protein-containing juice with an alkaline solution as the protein-containing juice is being liberated from the plants, such as by soaking the plants in the alkaline solution; or by treating the protein-containing juice with an alkaline solution after the protein-containing juice has been liberated from the plants, such as by feeding the alkaline solution into the juice.

The volume of the alkaline solution used is not critical as long as the plants or juice are thoroughly treated and the ultimate pH of the protein-containing juice is within the specified critical range. However, the temperature of the treating liquid should be about 60° C. or less (preferably about 50° C. or less) so that the protein-containing juice will not be prematurely heated to a temperature sufficient to cause coagulation of the chloroplasmic protein.

DETAILED DESCRIPTION OF THE INVENTION

The protein-containing juice may be liberated from the leafy green plants by pressing, soaking in a solvent or by a like operation. One such liberation processes is described in U.S. Pat. No. 3,775,133. When soaking is utilized to produce the protein-containing juice, the pH of the juice may be adjusted to a value greater than approximately 9.0 by soaking the plants in an alkaline solution as mentioned previously.

By the invention herein it has surprisingly been found that by raising the pH of the protein-containing juice liberated from leafy green plants to at least about 9.0 the cytoplasmic portion of the protein content of the juice may be raised dramatically to values as high as 75% of the total protein content of the plant juice. This result is particularly surprising in view of the reported investigations by others which indicate that the cytoplasmic portion of the protein recovered from extracted plant juices tends to level off with increasing pH.

Thus De Fremery et al., "Centrifugal Separation of White and Green Protein Fractions from Alfalfa Juice Following Controlled Heating," *J. Agr. Food Chem.*, Vol. 21, No. 5, 1973 reported that the cytoplasmic protein portion to be recovered from an extracted juice increased from 42% to 54% to about 57% as the pH increased from 5.9 to 7.0 to 8.0. This clear teaching that the cytoplasmic extraction curve levels off with increasing pH, taken together with the uniform conclusion of prior investigators in the art that little or no benefit is obtained by extracting plant juices at pHs of greater than 8.5 and that in fact at higher levels of pH such as 11.0 or higher the quality of the product begins to deteriorate because of protein degradation and saponafication, clearly suggests to those skilled in the art that no benefit would be obtained by treating plant juices at pHs higher than about 8.5.

Unexpectedly, the inventors herein have discovered that the cytoplasmic portion of the protein recovered from extracted plant juices continues to increase up to a pH of about 11.0. The effect of the pH treatment step of the invention is demonstrated by the following example in which 100 grams of fresh, chopped alfalfa was soaked in a solvent at a ratio of 5 parts by weight of solvent to one part by weight of alfalfa at ambient temperature for 10 minutes. The results are as follows:

| Solvent | pH | Cytoplasmic Protein % |
|---|---|---|
| Water | 6.1 | 45.2% |
| Calcium Hydroxide | 6.6 | 47.5 |
| Sodium Hydroxide | 7.6 | 54.2 |
| Potassium Hydroxide | 8.1 | 50.0 |
| Potassium Hydroxide | 8.7 | 52.9 |
| Ammonium Hydroxide | 10.4 | 59.6 |
| Sodium Hydroxide | 11.0 | 63.0 |
| Calcium Hydroxide | 11.5 | 38.9 |

The foregoing results demonstrate several factors. First, calcium hydroxide is not an acceptable alkali which is believed to be due to the fact that side reactions with juice constituents may occur. Secondly, the cytoplasmic protein content of the protein recovered from the extracted juice continues to increase up to pHs in the range of 11.0. Thirdly, sodium hydroxide and ammonium hydroxide are equally effective in increasing the cytoplasmic portion of the protein. Fourthly, while potassium hydroxide is perhaps not quite as effective as sodium hydroxide and ammonium hydroxide it too promotes the cytoplasmic protein recovery. It can therefore be concluded that many other alkalis will be suitable in the practice of the present invention provided that they do not, like calcium hydroxide, adversely react with the plant juices to decrease the protein yield.

It was also found that the percentage of cytoplasmic protein recovered could be increased by raising the pH of the juice after extraction. This was demonstrated when a sodium hydroxide was employed to raise the pH of extracted juice to 10.8 which resulted in 68.3% of the protein being recovered as cytoplasmic protein and when ammonium hydroxide was used to raise the pH of the juice to 9.9 which resulted in 55.9% of the protein being recovered as cytoplasmic protein.

In still other experiments alkylbenzenesulfonate surfactants such as Ultrawet 30 DS and Ultrawet 45 KN were employed to extract the plant protein from the fresh chopped alfalfa. At a pH of 9.05, 0.1% and 0.3% of Ultrawet 30 DS added to the extraction solvent resulted in the cytoplasmic protein portion of the protein recovered being 70% and 75% respectively. Similarly the addition of 0.1% and 0.3% of Ultrawet 45 KN to the extraction solvent at pHs of 8.9 and 9.0 respectively resulted in 71% and 74.5% cytoplasmic portions respectively. It will be appreciated by those skilled in the art that other surface active agents with detergency, dispersing, emulsification and wetting properties similar to alkylbenzenesulfonates will be suitable. For example it is expected that ethoxylated and sulfated alcohols will provide similarly improved cytoplasmic protein recovery.

After the protein-containing juice has been liberated and its pH adjusted, gross insoluables may be separated from the juice by a method such as sedimentation, low force centrifugation or filtration. The resultant fluid is then processed in a conventional manner to recover the protein in it. That is, the fluid is heated to about 70° C. or higher, acidified to a pH of about 5.0 or below or treated by a combination of these steps to form a protein coagulum, or curd comprising both cytoplasmic and chloroplastic protein, that will precipitate from the solution. The protein curd is then separated from the remaining liquid and recovered. Of course, if it is desired to separate the cytoplasmic and chloroplastic portions, conventional differential heat treatment may be used.

By the process of the invention, a considerable portion of the chloroplastic protein is extracted from the chloroplasts to which it is bound and converted to soluable cytoplasmic protein. It should be noted, however, that once the pH of the protein-containing juice is adjusted to the desired value, if substantially maximum conversion of chloroplastic protein to cytoplasmic protein is desired, the juice should be held at the adjusted pH before separating out the protein for a time sufficient to let such conversion take place. This time, preferable at least 1 minute and more preferably from 5 to 10 minutes will vary over a wide range, depending on many process factors. Those skilled in the art will readily be able to determine the holding time and the process variables other than pH which will maximize recovery with specific green plants and process equipment.

When adequate holding time is allowed, the final protein product will be comprised of from about 50 to about 75 percent cytoplasmic protein, as compared to a normal make-up of only about 30 to 45 percent cytoplasmic protein. Accordingly, the nutritional value of the final product will be raised, the protein efficiency ratio climbing from the range of 1.2 to 1.5 to within the range of from about 1.6 to about 2.1. Thus, by the improved process of the present invention the nutritional value of green leaf protein can be raised from about 33 to 67 percent over those currently obtainable. Further, it should be noted that this increase is realized without substantially lowering the total amount of protein recovered from a given volume of protein-containing juice.

Although minor modifications might be suggested by those versed in the art, it should be understood that we wish to embody within the scope of the patent warranted hereon all such modifications as reasonably come within the scope of our contribution to the art.

We claim:

1. In a process for recovering protein from leafy green plants comprising the steps of (1) extracting from freshly cut leafy green plants a chloroplastic and cytoplasmic protein containing juice at a temperature of less than about 60° C., (2) separating the insoluble matter from said juice, (3) coagulating the protein in said juice, and (4) recovering the coagulated protein, wherein the improvement comprises the step of, prior to said step (2), contacting said protein containing juice with a quantity of an alkaline solution sufficient to raise the pH of said juice to within the range of from greater than 8.5 to less than 12.0 for a sufficient time to allow conversion of a portion of the chloroplastic protein to soluble cytoplasmic protein whereby at least about 50% of the total protein recovered from the process is cytoplasmic protein.

2. The process of claim 1 wherein said contacting step is coincident with said extracting step (1).

3. The process of claim 1 wherein said alkaline solution is added to said freshly cut plants prior to said extracting step (1).

4. The process of claim 1,, or wherein said pH is from about 9.0 to about 12.0.

5. The process of claim 4 wherein said pH range is from about 9.5 to about 11.0.

6. The process of claim 1,, or wherein said temperature prior to step (2,) is less than about 50° C.

7. The process of claim 1,, or wherein said time for said contacting step is at least about one minute.

8. The process of claim 7 wherein said time is at least about five minutes.

9. The process of claim 1, or, wherein the alkaline solution further comprises a surfactant.

10. The process of claim 1, or, wherein the alkaline solution is selected from the group consisting of sodium hydroxide, sodium carbonate, ammonium hydroxide and potassium hydroxide.

11. The process of claim 1, or wherein, in step (4), the cytoplasmic and chloroplastic portions of the protein extracted from the plants are separately recovered.

12. The process of claim 2 wherein said pH is from about 9.0 to about 12.0.

13. The process of claim 12 wherein said pH range is from about 9.5 to about 11.0.

14. The process of claim 2 wherein said temperature prior to step (2) is less than about b 50° C.

15. The process of claim 2 wherein said time for said contacting step is at least about one minute.

16. The process of claim 15 wherein said time is at least about five minutes.

17. The process of claim 2 wherein the alkaline solution further comprises a surfactant.

18. The process of claim 2 wherein the alkaline solution is selected from the group consisting of sodium hydroxide, sodium carbonate, ammonium hydroxide and potassium hydroxide.

19. The process of claim 2 wherein, in step (4), the cytoplasmic and chloroplastic portions of the protein extracted from the plants are separately recovered.

20. The process of claim 3 wherein said pH is from about 9.0 to about 12.0.

21. The process of claim 20 wherein said pH range is from about 9.5 to about 11.0.

22. The process of claim 3 wherein said temperature prior to step (2) is less than about 50° C.

23. The process of claim 3 wherein said time for said contacting step is at least about one minute.

24. The process of claim 23 wherein said time is at least about five minutes.

25. The process of claim 3 wherein the alkaline solution further comprises a surfactant.

26. The process of claim 3 wherein the alkaline solution is selected from the group consisting of sodium hydroxide, sodium carbonate, ammonium hydroxide and potassium hydroxide.

27. The process of claim 3 wherein, in step (4), the cytoplasmic and chroloplastic portions of the protein extracted from the plants are separately recovered.

* * * * *